United States Patent
Ou

(10) Patent No.: US 8,314,512 B2
(45) Date of Patent: Nov. 20, 2012

(54) DC POWER SYSTEM USING HCPV AND BIPV MODULES

(75) Inventor: Ting-Chia Ou, Taoyuan (TW)

(73) Assignee: Atomic Energy Council—Institute of Nuclear Energy Research, Lungtan, Taoyuan (TW)

( * ) Notice: Subject to any disclaimer, the term of this patent is extended or adjusted under 35 U.S.C. 154(b) by 366 days.

(21) Appl. No.: 12/690,340

(22) Filed: Jan. 20, 2010

(65) Prior Publication Data

US 2011/0067744 A1    Mar. 24, 2011

(30) Foreign Application Priority Data

Sep. 24, 2009   (TW) ................................ 098132227

(51) Int. Cl.
*H02J 1/10* (2006.01)
(52) U.S. Cl. .......................................... 307/43; 307/72

(58) Field of Classification Search .................... 307/43, 307/72, 80; 136/244
See application file for complete search history.

(56) References Cited

U.S. PATENT DOCUMENTS

| 4,551,631 A | * | 11/1985 | Trigilio .......................... 290/55 |
| 5,929,538 A | * | 7/1999 | O'Sullivan et al. ............. 307/66 |
| 2010/0133911 A1 | * | 6/2010 | Williams et al. ............... 307/82 |

FOREIGN PATENT DOCUMENTS

DE     100 19 294     10/2001

* cited by examiner

*Primary Examiner* — Carlos Amaya
(74) *Attorney, Agent, or Firm* — Jackson IPG PLLC

(57) ABSTRACT

A direct current (DC) power system uses High Concentration Photovoltaic (HCPV) modules and Building-Integrated Photovoltaic (BIPV) module. Power outputs of the HCPV/BIPV modules are mixed to improve utilization of generated power. Thus, solar power is used through best power control and energy conservation.

4 Claims, 2 Drawing Sheets

DC POWER SYSTEM USING HCPV AND BIPV MODULES

CROSS REFERENCE TO RELATED PATENT APPLICATIONS

This application claims priority from Taiwan Patent Application No. 098132227, filed in the Taiwan Patent Office on Sep. 24, 2009, entitled "DC Power System Using HCPV and BIPV Modules" and incorporates the Taiwan patent application in its entirety by reference.

TECHNICAL FIELD

The present disclosure is related to a direct-current (DC) power system, more particularly, it is also related to how to achieve maximum power tracking with a polynomial relation between voltage and current of High Concentration Photovoltaic (HCPV) modules coordinated with a Building-Integrated Photovoltaic (BIPV) module.

DESCRIPTION OF THE RELATED ARTS

A traditional equivalent circuit of solar cell using diode comprises a current source, one or two diodes, and some resistors. Its charging efficiency is affected by strength of sun-light, material of the cells, environmental temperature, positions and directions of the cells, and circuit design of the cells. A HCPV module is used to improve efficiency of lens on traditional concentration photovoltaic module. However, the curve of power generation for a photovoltaic board using the HCPV module is non-linear, and the output power of the photovoltaic board is perturbed by following the movement of an active sun-tracking system, where the curves for voltage, current and power are further non-linear.

The technology for power generation using HCPV modules is very important. However, traditionally, the HCPV modules do not fully use the diversity of solar energy. Furthermore, traditional method for tracking maximum power is done by monitoring perturbation, which does not get the best out of HCPV technology. Therefore, the prior arts do not fulfill all users' requests in actual use.

SUMMARY OF THE DISCLOSURE

The main purpose of the present disclosure is to achieve maximum power tracking with a polynomial relation between voltage and current of HCPV modules coordinated with a BIPV module.

The minor purpose of the present disclosure is to provide output power, which is originated from HCPV/BIPV modules with improved efficiency of power usage, to fully utilize solar energy by using a power-saving technology of maximum power control.

To achieve the above purposes, the present disclosure is a DC power system using HCPV and BIPV modules. It comprises a solar energy module, a storage bank, a maximum power point tracking (MPPT) converter and an inverter, where HCPV/BIPV modules provide electric energy transformed from solar energy. After being processed by the MPPT converter, the power transformed is provided to a DC bus with the shunted storage bank, and then extra energy is transformed from DC to AC by the inverter to supply power to an AC load. Moreover, if the energy supplied by the HCPV/BIPV modules is insufficient, then power will be supplied from an outside power source. Accordingly, a novel DC power system using HCPV and BIPV modules is obtained.

BRIEF DESCRIPTION OF THE DRAWINGS

The present disclosure will be better understood from the following detailed description of the preferred embodiment, taken in conjunction with the accompanying drawing(s), in which.

DESCRIPTION OF THE PREFERRED EMBODIMENT

The following description of the preferred embodiment is provided to understand the features and the structures of the present disclosure.

Figure 1:
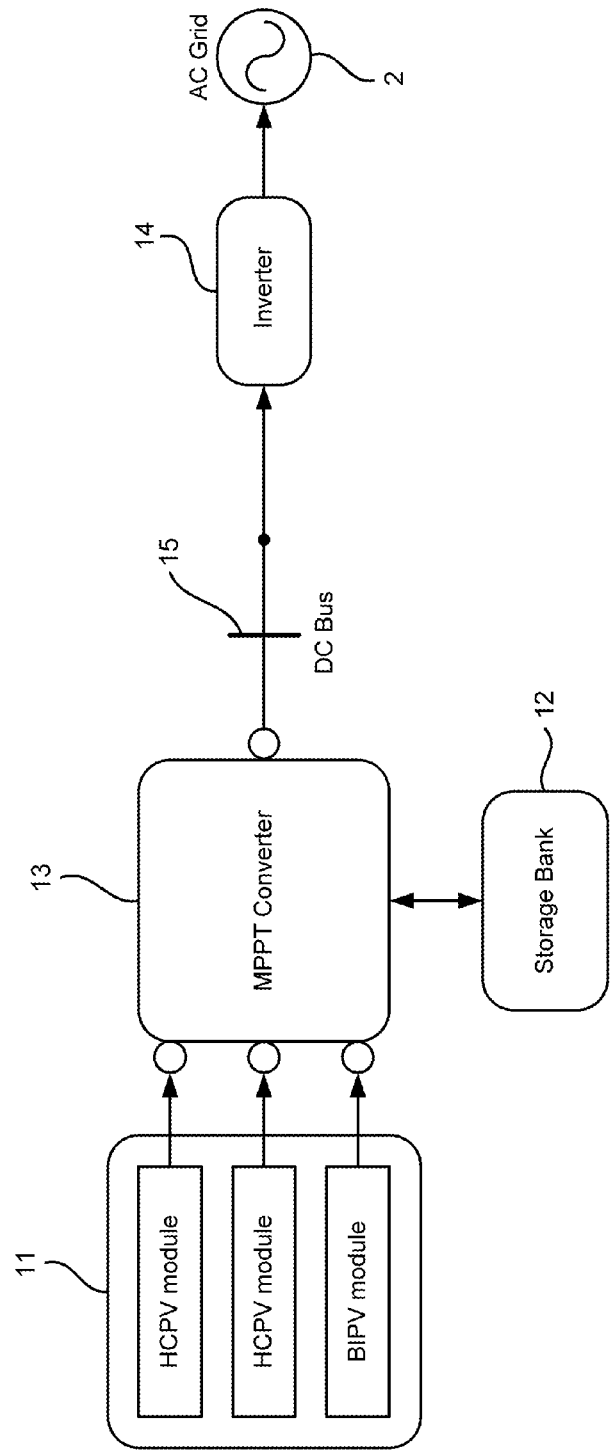
FIG. 1 is the structural view showing the preferred embodiment according to the present disclosure.

Refer to FIG. 1, which is a structural view showing a preferred embodiment according to the present disclosure. As shown in the figure, the present disclosure is a direct-current (DC) power system using High Concentration Photovoltaic (HCPV) and Building-Integrated Photovoltaic (BIPV) modules, comprising a solar energy module 11, a storage bank 12, a maximum power point tracking (MPPT) converter 13, an inverter 14 and a DC bus 15, where HCPV modules and a BIPV module are combined to improve utilization rate of output energy and fully utilize solar energy through MPPT with maximum power control.

The solar energy module 11 transforms solar energy into electric energy, which is output through the DC bus 15, where the solar energy module 11 comprises more than two HCPV modules and a BIPV module. And each of the HCPV modules has an active sun tracker.

The storage bank 12 is a storage device of solar energy to charge and discharge electric energy as well as to buffer a voltage on the DC bus 15. Or, the storage bank 12 can be a set of storage devices connected with the DC bus 15.

The MPPT converter 13 is connected between the solar energy module and the storage bank. On one hand, the MPPT converter 13 stores energy output from the solar energy module 11 into the storage bank 12. On the other hand, the MPPT converter 13 stabilizes voltage output from the solar energy module 11 and then outputs the voltage into the DC bus 15. Furthermore, the MPPT converter 13 monitors voltage on the DC bus 15 to cut off the storage bank and close the DC power system when the voltage is greater than a preset value.

The inverter 14 is connected with an alternative-current (AC) grid 2 through the DC bus 15. Thus, a novel DC power system using HCPV and BIPV modules is obtained.

Relation between voltage and current of the HCPV module is non-linear, and it is a polynomial expressed as:

$$i(x) = p_0 + p_1 v(x) + p_2 v(x)^2 + \ldots + p_n v(x)^n = \sum_{i=0}^{n} p_i v(x)^i.$$

Therein, the variables i(x) and v(x) are output current and output voltage of a discrete time domain, respectively; and p is a parameter of the polynomial. Furthermore, the polynomial is expressed as the following vectors and matrix:

$$I = [i(1), i(2), i(3), \ldots i(x)]^T$$

$$V = \begin{bmatrix} 1 & 1 & 1 & \ldots & 1 \\ v(1) & v(2) & v(3) & \ldots & v(x) \\ v^2(1) & v^2(2) & v^2(3) & \ldots & v^2(x) \\ \vdots & \vdots & \vdots & \ddots & \vdots \\ v^n(1) & v^n(2) & v^n(3) & \ldots & v^n(x) \end{bmatrix},$$

$$P = [p_0, p_1, p_2, \ldots p_n]^T.$$

Therein, I is an output vector expressed as: $I = V^T P$.

These formulas are applied in a real time system, where, since order of the polynomial is quite small, accuracy of the result will not be perturbed by instability. Therein, its error vector is expressed as: $\|\epsilon\|^2 = \|I - V^T P\|^2$; and, according to least squares curve fitting theorem, a vector of an estimated parameter is expressed as: $\hat{p} = (V^T V)^{-1} V^T I$.

Thus, through the above calculations, the output currents and the output voltages of the HCPV modules are obtained.

Accordingly, the present disclosure uses an MPPT converter to integrate multiple power resources with multiple power-transformation systems to directly output power to a DC bus.

Figure 2:
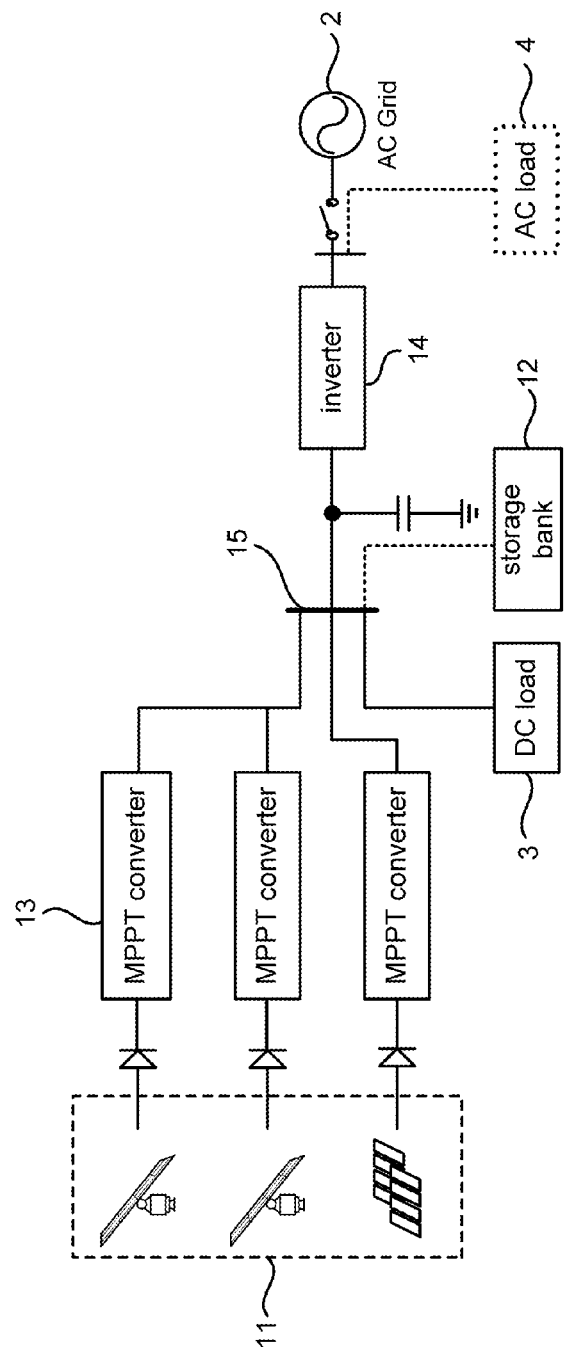
FIG. 2 is the block view showing the preferred embodiment.

Refer to FIG. 2, which is a block view showing the preferred embodiment. As shown in the figure, by using the present disclosure, a solar energy module 11 combines HCPV/BIPV modules to provide electric energy transformed from solar energy. Then, after being processed by a MPPT converter, the power generated is provided as a DC load 3 to a DC bus 15 with a shunted storage bank as a voltage regulation strategy. Therein, extra energy is transformed from DC to AC by an inverter 14 to supply power to an AC load 4. Or, if the energy supplied by the HCPV/BIPV modules is insufficient, power will be supplied from an outside AC grid or other power resources.

As a result, the present disclosure not only provides solar energy from a solar energy module to a DC load, but also feeds extra energy into AC grid if any. Furthermore, if energy supplied by the present disclosure is insufficient, power will be supplied from AC grid.

In this way, the present disclosure mixes powers generated through HCPV/BIPV modules, where each of the HCPV modules is equipped with an active sun tracking system and a polynomial relation of voltage and current; and a maximum power is thus tracked through the polynomial relation of voltage and current, these HCPV modules coordinated with the BIPV module could get a maximum power. Therefore, a strategy for optimizing power usage is achieved by using the HCPV/BIPV modules to fully utilize solar energy through MPPT with maximum power control.

To sum up, the present disclosure is a DC power system using HCPV and BIPV modules, where each HCPV module is equipped with an active sun tracking system and a polynomial relation of voltage and current. By tracking through the polynomial relation of voltage and current, these HCPV modules coordinated with the BIPV module could get a maximum power. And a strategy for optimizing power usage is thus achieved by using the HCPV modules coordinated with BIPV to fully utilize solar energy through MPPT.

The preferred embodiment disclosed herein is not intended to unnecessarily limit the scope of the disclosure. Therefore, simple modifications or variations belonging to the equivalent of the scope of the claims and the instructions disclosed herein for applying a patent are all within the scope of the present disclosure.

What is claimed is:

1. A direct-current (DC) power system, the DC power system comprising:
    a DC bus;
    a solar energy module comprising:
        at least one High Concentration Photovoltaic (HCPV) module, each HCPV module having an active sun tracker and
        a Building-Integrated Photovoltaic (BIPV) module, said solar energy module transforming solar energy into electric energy to be output through the DC bus;
    a storage bank, said storage bank being a storage device of solar energy that charges and discharges electric energy and buffers a voltage on said DC bus;
    a maximum power point tracking (MPPT) converter, said MPPT converter being connected between said solar energy module and said storage bank, said MPPT converter saving energy outputted from said solar energy module into said storage bank, said MPPT converter performing a calculation of a polynomial relation of voltage and current and stabilizing voltage outputted from said solar energy module and outputting said voltage from said solar energy module into said DC bus, said MPPT converter monitoring a voltage on said DC bus to cut off said storage bank and close said DC power system when said monitored voltage is greater than a preset value; and
    an inverter, said inverter being connected with an alternating-current (AC) grid through said DC bus.

2. The DC power system according to claim 1, wherein said solar energy module comprises more than two HCPV modules and a BIPV module, and wherein each of said HCPV modules is equipped with an active sun tracker.

3. The DC power system according to claim 2, wherein a maximum power is tracked through a polynomial relation of said HCPV module coordinated with said BIPV module.

4. The DC power system according to claim 1, wherein said storage bank is a set of storage devices shunted with said DC bus.

* * * * *